United States Patent [19]

Nanba

[11] 4,299,143
[45] Nov. 10, 1981

[54] APPARATUS FOR AUTOMATICALLY PROFILE-FORMING SAW TEETH

[75] Inventor: Taro Nanba, Sanjo, Japan

[73] Assignee: Yugenkaisha Nakaya Nokogirikikai Seisakusho, Niigata, Japan

[21] Appl. No.: 82,892

[22] Filed: Oct. 9, 1979

[30] Foreign Application Priority Data

Oct. 13, 1978 [JP] Japan ................................ 53-125751

[51] Int. Cl.³ ............................................. B23D 63/12
[52] U.S. Cl. .............................................. 76/43; 76/76
[58] Field of Search ................. 76/37, 39, 43, 75, 77, 76/76, 112, 44

[56] References Cited

U.S. PATENT DOCUMENTS 2,091,501 8/1937 De Long et al. ..................... 76/77

FOREIGN PATENT DOCUMENTS 1014823 8/1957 Fed. Rep. of Germany .......... 76/43
46-12477 4/1971 Japan .
51-148844 7/1976 Japan .
695484 8/1953 United Kingdom ................... 76/43

Primary Examiner—Roscoe V. Parker
Attorney, Agent, or Firm—John E. Reilly

[57] ABSTRACT

Apparatus for automatically profile-forming saw teeth wherein the apparatus includes a carriage on which a saw blade to be toothed is securely fixed and an intermittent longitudinal drive is adjustable to set a distance between one saw tooth and an adjacent saw tooth of a template or saw blade used as a pattern which is attached to the carriage. An input shaft of a clutch/brake mechanism is provided to operate a longitudinal feed mechanism by pendular motion whereby longitudinal advancement of the carriage is achieved. Upon determining the desired longitudinal feed, the carriage is stopped and fed transversely toward a cutter by means of a transverse feed cam to cut new saw teeth or to recut teeth on an existing saw blade.

6 Claims, 8 Drawing Figures

APPARATUS FOR AUTOMATICALLY PROFILE-FORMING SAW TEETH

This invention relates to a novel and improved method and apparatus for automatically profile-forming saw teeth, either on a saw blade blank or to recut saw teeth on an existing saw blade.

BACKGROUND OF THE INVENTION

In the past, the cutting or toothing of a saw blade has been to a large extent a manual operation requiring virtually constant attention of an operator of the cutting machinery. While some saw blades are cut semi-automatically, the machinery is both large and complex so that it is correspondingly expensive as a capital investment which in turn inflates the price of the produced blade. Even cutting apparatus which are semi-automatic require complicated adjustments and still require substantial operator attention, such that large inefficiencies are present in the manufacture of such saw blades.

SUMMARY OF THE INVENTION

It is therefore an object of the present invention to provide an apparatus and a method for automatically profile-forming saw teeth in a new saw blade blank or to recut teeth on an old saw blade.

Another object of the present invention is to provide for a method and apparatus for inexpensively cutting or recutting saw teeth which requires a minimum number of steps to initiate and which requires a minimum of operator interaction with the machinery.

It is still a further object of the present invention to provide an apparatus which allows adjustable selection of distance between saw teeth and which, after cutting one tooth, automatically advances to the next tooth position and locks the blade in that position whereby a blade may transversely cut an adjacent tooth.

A still further object of the present invention is to provide apparatus and method for cutting saw teeth accurately in either direction, that is, cutting both front-side saw teeth and rear-side saw teeth.

Specifically, fully automatic apparatus is provided for accurately cutting or reforming saw teeth on a saw blade blank or on a blade to be retoothed. To determine the pattern of the teeth to be cut, a template or second saw blade is used as a pattern and a blade to be cut is securely fixed to a carriage. The carriage is automatically moved a longitudinal increment by a clutch/brake mechanism operating a longitudinal feed. The carriage is then braked in a longitudinal direction and is subsequently fed transversely toward a cutter by means of a transverse feed cam.

In more detail, the method and apparatus of profile-forming saw teeth according to the present invention utilizes a carriage which is fed longitudinally with respect to a template in a first direction after which it is fed back slightly in a reverse direction until the carriage is tightly engaged with a positioning claw to accurately set the longitudinal spacing a precise distance with respect to the template to determine the correct feed of the carriage. Once the carriage feed is determined, longitudinal movement of the carriage is stopped by a braking mechanism, and a transverse feed cam is automatically activated to move the carriage transversely in forcing the workpiece against a cutter. Since the longitudinal feed always reverses its motion to engage the positioning claw, a wide variety of saw teeth may be formed since a template may be profiled with a variety of spacings, and it is therefore possible to cut teeth at unequal intervals on the blade.

In addition, the cutter may be positioned so that teeth may be formed front-side, or forwardly, such as, to form cross-cut teeth or rearside, or rearwardly as is the case in forming rip saw teeth.

Other objects, advantages and features of the present invention will become more readily appreciated and understood when taken together with the following detailed description in conjunction with the accompanying drawings, in which:

DETAILED DESCRIPTION OF THE PREFERRED EMBODIMENT

Figure 2:
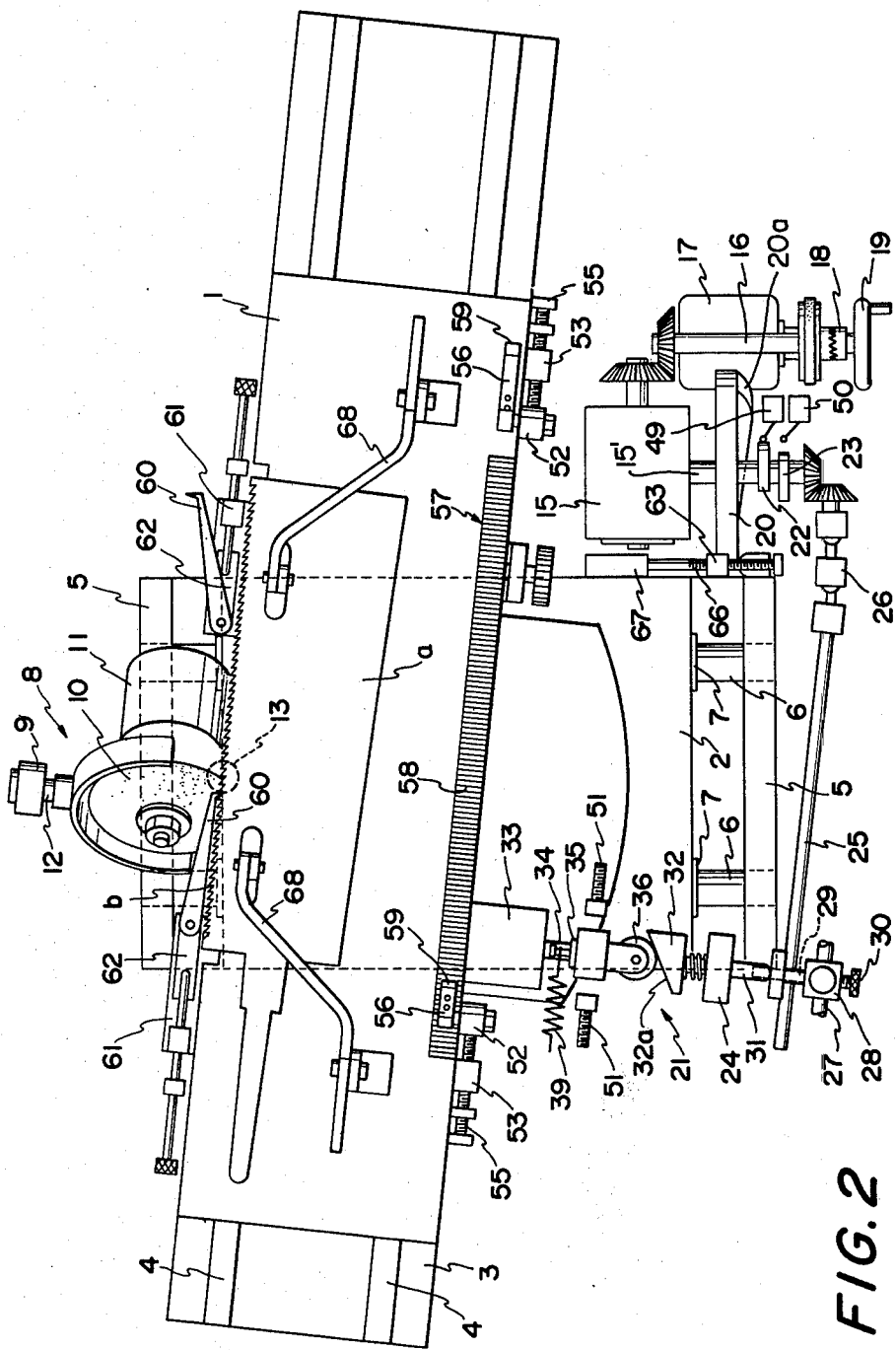
FIG. 2 is a top view of the apparatus in accordance with the present invention.

Referring to the embodiment of the invention shown in the drawings, a carriage 1, which firmly secures a saw blade or workpiece thereon, is rotatable horizontally about a vertical shaft 13, shown in FIG. 2, with respect to a transverse feed block 2, and is slidable in a longitudinal direction along guide rails 4 provided on a guide block 3 which is also rotatable horizontally with the carriage 1. Holders 7 are securely fixed to the transverse feed block 2 and are slidably mounted on guide rods 6 which are extended horizontally and transversely in a frame 5 shown in FIG. 2. A cutter section 8 is provided on one side of the carriage 1. A support 9 is extended from the frame 5 in order to support a rod or drive shaft 12 projecting from a motor 11, which drives a cutter blade 10 in such a manner that the cutter blade 10 is positioned transverse to the frame 5. The shaft 12 can be fixed at different angles with respect to the support 9 so that the cutter blade 10 can be angled to the surface of the carriage 1. The guide block 3 is rotatable horizontally about the shaft 13 so that the carriage 1 can be angled horizontally to the cutting blade 10. In this case, that angle is indicated by a marking 14 on an edge surface of the guide block 3.

As further shown in FIG. 2, on one side of the frame 5 is fixed a reduction gear 15 whose input shaft is provided with a bevel gear which is enmeshed with a bevel gear on a drive shaft 16. A pulley mounted on the drive shaft 16 is engaged with a pulley of a motor 17 through a V-belt 17'. At one end of the drive shaft 16 is provided a hand wheel and a clutch 18. On the other hand, an output shaft 15' of the reduction gear is provided with a transverse feed cam 20 as well as timing cams 22 and 23 for a longitudinal feed mechanism 21 which will be mentioned later. A bevel gear fixed at an end of the output shaft 15' is enmeshed with a bevel gear mounted at an end of a shaft 25 of the longitudinal feed mechanism 21, and the shaft 25 is provided with a flexible joint 26.

The longitudinal feed mechanism 21 is secured by a bracket 24 which is mounted on the guide block 3. A lever 28 pivots about shaft 27 which acts as a fulcrum. Although not shown, the shaft 27 may be supported by the bracket 24. A lower end of the lever 28 is in contact with a longitudinal feed cam 29 which is rotated together with the shaft 25. Furthermore, an upper end of the lever 28 is connected to a connecting rod 31 through an adjusting screw 30 so as to press the connecting rod 31. In addition, the connecting rod 31 is supported by the bracket 24 and is biased or spring-loaded by a spring 31' on the rod 31 and acting against the bracket 24. At one end of the connecting rod 31 is provided a flat, right-angled triangular cam member 32 which has a slope face 32a and is reciprocal or reversible in a horizontal direction under the control of the lever 28.

Figure 3:
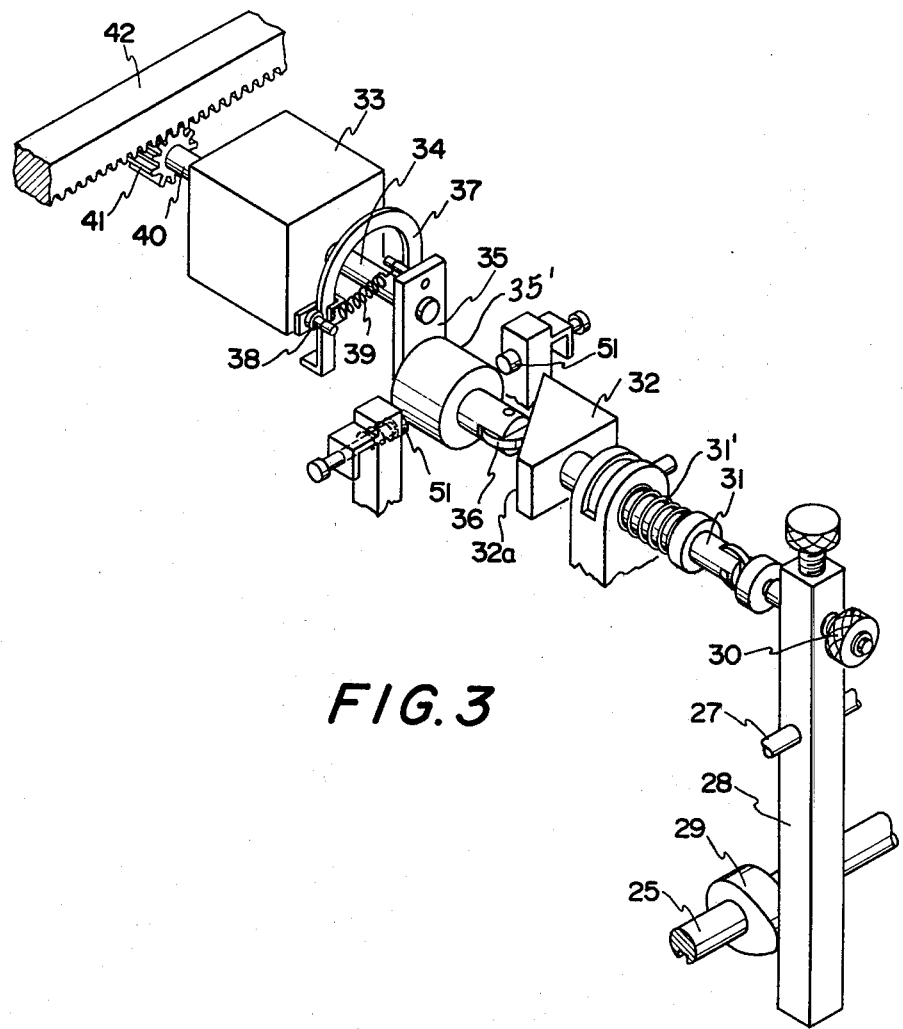
FIG. 3 is a perspective view of a longitudinal feed mechanism for the preferred form of invention.

An input shaft 34 of a clutch/brake mechanism 33 is journaled in spaced parallel relation to the rod 31 by a support plate 35 extending from the rear face of a collar 35'; and the shaft 34 is positioned inside an arch-shaped guide member 37. As shown in FIG. 3, shaft 34 is forced by tension coil spring 39, which is connected to a movable hook 38 attached to the arch-shaped guide member 37, in such a manner that a roller 36 is urged into contact with the slope face 32a. Furthermore, a pinion 41 mounted on an output shaft 40 of the clutch/brake mechanism 33 is enmeshed with a rack 42 which is attached to the underside of the carriage 1.

Figure 1:
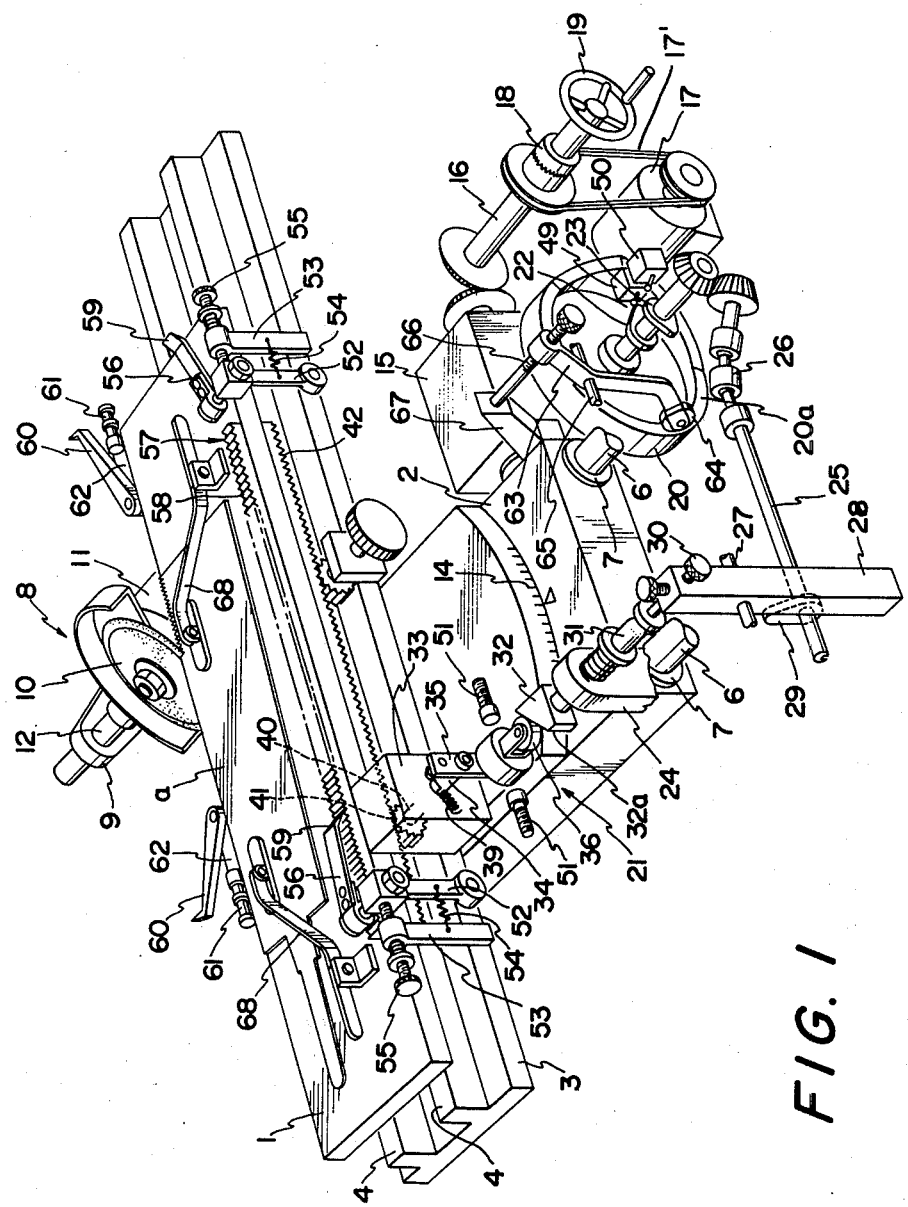
FIG. 1 is a perspective view of a saw tooth cutting apparatus according to the preferred embodiment of the present invention.
Figure 4:
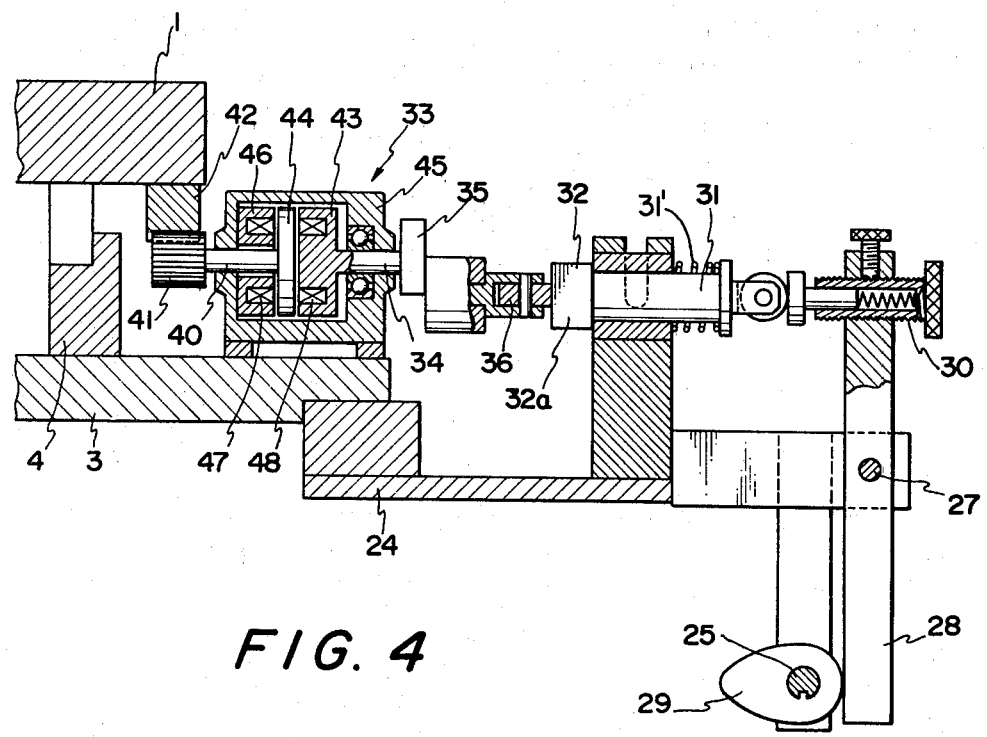
FIG. 4 is a vertical sectional view of a major portion of the said longitudinal feed mechanism.

As shown in section in FIG. 4, the clutch/brake mechanism 33 also includes a clutch disc 43 provided at one end of the input shaft 34, a magnet clutch disc 44 provided at one end of the output shaft 40 and facing the clutch disc 43, and a brake disc 46 fixed to a housing 45. Moreover, electromagnetic coils 47 and 48 are provided in the brake disc 46 and the clutch disc 43, respectively. As a result, the output shaft 40 can be engaged or disengaged with the input shaft 34, or braked and stopped by limit switches 49 and 50 which are turned on or off by the timing cams 22 and 23 as illustrated in FIG. 1. Adjusting screws 51 engage a collar 35' to determine or limit the lateral movement of the roller 36 as shown in FIGS. 1 to 3. Swinging levers 52 are provided at both sides of the guide block 3 and connected to adjacent fixed supporting rods 53 through tension coil springs 54 and adjusting screws 55, so that tilting of the swinging levers 52 about lower pivotal ends can be freely adjusted. Positioning members 56 rotatably attached to upper ends of the swinging levers 52 are engageable with a template 57 fixedly attached on the carriage 1 in such a manner that claws 59 at the distal ends of the positioning members 56 are enmeshed with teeth 58 of the template 57. Another pair of positioning members 60 are rotatably attached to top ends of supporting rods 62 which are adjustable in the sliding direction of the carriage 1, and are supported on brackets 61 projecting from one side of the guide block 3. As a result, the positioning members 60 can be engaged with teeth of a saw blade set on the carriage 1.

A lever 63 is rotatably supported by a shaft 65 extending from the frame 5. At the lower end of the lever 63 is provided a roller 64 which is in contact with a cam face 20a of the transverse feed cam 20. The upper end of the lever 63 is in contact with a part 67 projected from the transverse feed block 2 via an adjusting screw 66 so as to urge the transverse feed block 2 in a direction toward the cutting blade 10, and the feed block 2 is returned by the force of return springs, not shown, but which for example may be mounted on the guide rods 6 within the feed block 2 and urge the feed block 2 in the return direction.

Retaining bars 68 pivotally mounted on the upper surface and at opposite ends of the carriage 1 serve to securely hold a saw blade in position on the carriage 1.

Operation of the means according to the present invention will be described as follows: (1) Adjust a cutting angle with reference to the angle marking 14 on the guide block 3 which indicates a horizontal angle between the transverse feed block 2 and the guide block 3; (2) adjust the cutting angle by turning the rod 12 of the cutting blade 10; (3) exchange the cutting blade 10 with a proper one; (4) set the template 57; (5) set one of the positioning members 56 or one of the positioning members 60 with respect to the template 57; and (6) determine a setting direction for the member 32 of the longitudinal feed mechanism 21 and the movable hook 38.

A saw blade "a" is retained in place on the carriage 1 by means of the retaining bars 68 so that its edge to be cut is projected toward the cutter blade 10 from the side of carriage 1. Longitudinal feed of the saw blade "a" is made in the same manner in any teeth cutting such as leading tooth, back tooth or subsequent tooth, or the front and rear tooth of a crosscut saw, as well as the teeth of a rip saw.

Figure 5A:
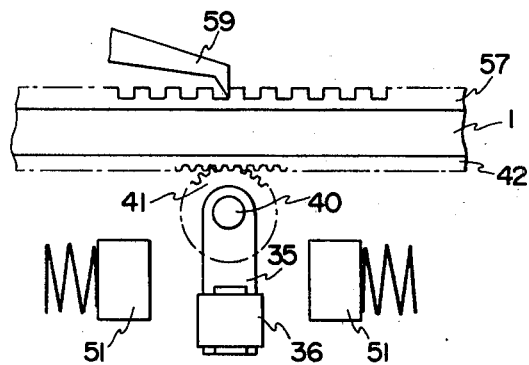
FIGS. 5A to 5C are illustrations showing transverse feed operations.
Figure 5B:
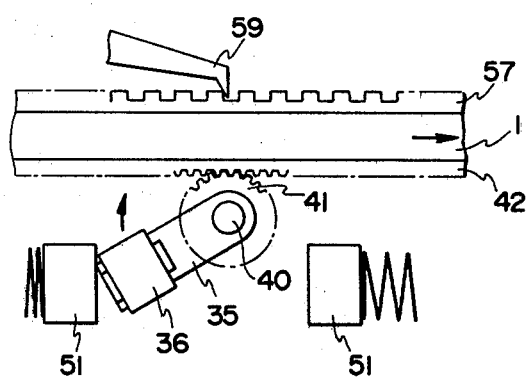
Figure 5C:
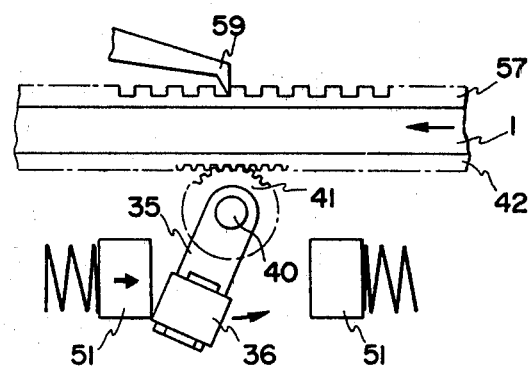

In FIG. 1, in cutting teeth by using the template 57, which the left positioning member 56 is engaged with the teeth 58 on the upper surface of the template 57. After starting the cutting blade drive motor 11, the feed mechanism drive motor 17 is started, and the transverse feed cam 20 and timing cams 22 and 23, all being mounted on the output shaft of the reduction gear 16, are rotated through the reduction gear 16. The transverse feed block 2 is fed by the movement of the cam face 20a of the transverse feed cam 20 through the lever 63 to urge the saw blade "a" fixed on the carriage 1 against the cutting blade 10. At the same time, the output shaft of the reduction gear 15 makes the longitudinal feed cam 29 rotate through the bevel gears and the flexible joint 26. By the rotation of the longitudinal feed cam 29, the lever 28 swings and presses intermittently the end of the connecting rod 31, thus causing the reciprocating movement of the member 32. As a result, the roller 36 which is pressed against the slope face 32a of the member 32 is forced to move somewhat laterally across the slope face 32a as shown in FIGS. 5A to 5C. Accordingly, the input shaft 34 of the clutch/brake mechanism 33 starts to reciprocate through limited angles in either direction with the aid of the coil spring 39. This reciprocal movement of the shaft 34 about its axis is converted to intermittent rotation of the output shaft 40 through the clutch mechanism. Furthermore, this intermittent rotation of the output shaft 40 is converted to intermittent longitudinal feed through the pinion 41 mounted on the output shaft 40 and rack 42 provided under the carriage 1.

Figure 6:
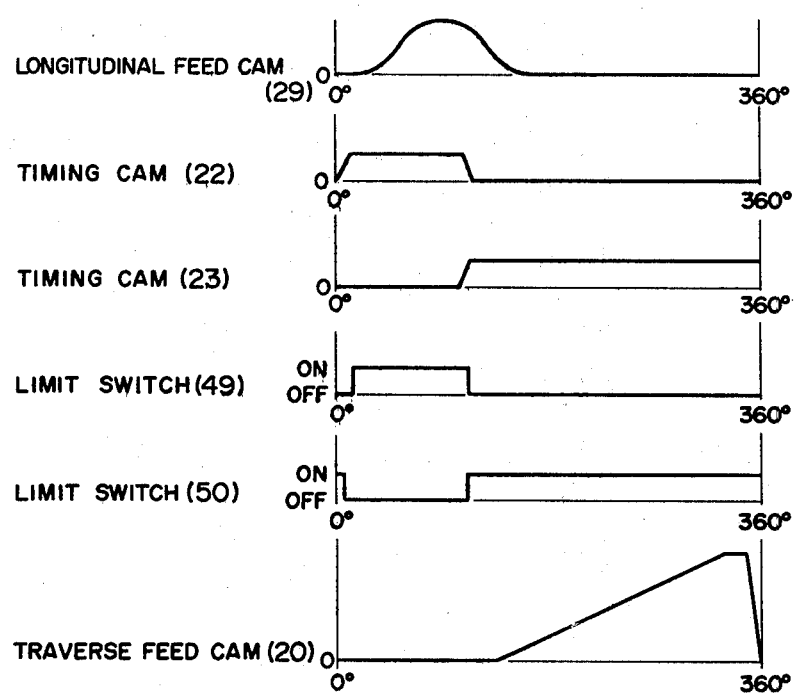
FIG. 6 is a timing charge of a cam mechanism for use in practicing the preferred form of invention.

As illustrated in the timing chart of FIG. 6, the clutch disc 43 and brake disc 46 are controlled by limit switches 49 and 50, and the swing movement of the roller 36 about the shaft 34 in either direction is converted to intermittent rotational movement of the output shaft 40. It should be noted that this swing movement in either direction is one of the principal features of the present invention. From FIGS. 5 and 6, the swing member or plate 35 is swung by the slope face 32a and finally presses one of adjusting screws 51 against its coil spring. At this time, since the clutch is engaged, the pinion 41 revolves, and the carriage 1 moves with the rack 42 in longitudinal direction. Also, the claw 59 of the positioning member 56 shifts from one tooth of the template 57 to another. In this case, since the feed of the carriage 1 is slightly different from the pitch of the teeth of the template 57, the claw 59 is positioned at the bottom of the teeth as shown in FIG. 5B, not on the head of teeth. Under this condition, when the member 32 is returned, the swing member 35 is restored to an original position by means of the coil spring of the adjusting screw 51 and the coil spring 39 provided at the movable hook 38. At this time, since the said clutch is still engaged, the pinion 41 rotates in the reverse direction and the carriage is also returned. Thus, the claw goes into a correct pitch position as shown in FIG. 5C and stopped there. At this time, the clutch of the clutch/brake mechanism 23 is disengaged by the operation of the timing cams 22 and 23, and simultaneously the brake actuates. As a result, the carriage 1 is locked in that position, and the carriage 1 fed toward the cutting blade 10 by means of the cam face 20a of the transverse feed cam 20 to cut one saw tooth. After this cutting, the clutch is engaged again, and the member 32 is moved toward the roller 36.

According to the operation mentioned above, saw teeth of a saw blade can be continuously cut by using the template 57. FIG. 2 shows reshaping of saw teeth in which the saw teeth of the saw blade "a" are used instead of the template 57. Here, the right positioning member 60 is employed. This member 60 is engaged with a saw tooth just ahead of the tooth to be reshaped by the cutting blade 10. Similar to the above description, the saw blade can be accurately fed by means of the positioning member 60 which profiles the already shaped saw teeth, and by backward movement of the longitudinal feed mechanism.

As mentioned above, the saw teeth cutting means according to the present invention can accurately profile a template or shaped saw teeth by return lock function of the positioning member and returning of the longitudinal feed mechanism. This means accuracy of teeth cutting is closely related to that of the template. Therefore, the higher the accuracy of the template, the higher the accuracy of saw teeth cutting.

In the method according to the present invention in which saw teeth are cut by profiling a template or shaped saw teeth, even saw teeth whose pitches change gradually can be profiled accurately and positively. Therefore, this method can be applied to a wide variety of saws and all kinds of saw teeth can be cut by one apparatus of the present invention. It can be said that the effect of this invention is extremely great.

Although the present invention has been described with particularity relative to the foregoing detailed description of the preferred embodiment, various modifications, changes, additions and applications other than those specifically mentioned herein will be readily apparent to those having normal skill in the art without departing from the spirit and scope of this invention.

I claim:

1. In saw tooth forming apparatus wherein a saw blade to be toothed is affixed to a carriage, said carriage being both longitudinally and transversely movable to advance the saw blade toward and away from a rotatable cutter positioned in confronting relation to said saw blade, the improvement comprising:
    intermittent carriage feed means operative to intermittently advance said carriage in a longitudinal direction, said carriage feed means including a rack mounted on said carriage, a clutch mechanism having an output shaft and a pinion mounted on said output shaft and aligned for engagement with said rack, an input shaft for said clutch mechanism and indexing means for reversibly rotating said input shaft about its longitudinal axis, and clutch control means coordinated with said indexing means to selectively effect engagement and disengagement of said clutch mechanism whereby to cause intermittent longitudinal advancement of said carriage by rotation of said pinion in response to rotation of said input shaft;
    a template member positioned on said carriage and defining a pattern of teeth at longitudinally spaced intervals along said carriage corresponding to the desired spacing of teeth to be formed in said saw blade, and a positioning member selectively engageable with successive teeth of said template as said carriage is intermittently advanced by said carriage feed means; and
    transverse carriage advancing means coordinated with said clutch control means to control the transverse movement of said carriage toward and away from said rotatable cutter for forming a succession of teeth in said saw blade as said carriage is intermittently advanced in a longitudinal direction by said carriage feed means.

2. In saw tooth forming apparatus according to claim 1, said carriage feed means including a motion imparting mechanism axially reciprocal to impart rotational movement to said input shaft of said clutch mechanism.

3. In saw tooth forming apparatus according to claim 2, said motion imparting mechanism including a shaft having a sloped face at one end and cam operated means to impart axial reciprocation to said sloped face, and a roller member engageable with said sloped face and responsive to axial reciprocation of said sloped face to impart rotational movement to said input shaft.

4. In saw tooth forming apparatus according to claim 3, said input shaft including a support member interconnecting said input shaft to said roller, and motion limiting means being adjustable to control the angular motion of said roller member.

5. In saw tooth forming apparatus according to claim 1, including means for angularly adjusting said carriage with respect to the axis of rotation of said cutter blade.

6. In saw tooth forming apparatus according to claim 1, including means to adjustably control the axis of rotation of said cutter blade.

* * * * *